(12) United States Patent
Kato

(10) Patent No.: US 8,655,122 B2
(45) Date of Patent: Feb. 18, 2014

(54) MODE CONVERTER

(75) Inventor: Taro Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/395,722

(22) PCT Filed: Nov. 30, 2010

(86) PCT No.: PCT/JP2010/071775
§ 371 (c)(1),
(2), (4) Date: Mar. 13, 2012

(87) PCT Pub. No.: WO2011/068235
PCT Pub. Date: Jun. 9, 2011

(65) Prior Publication Data
US 2012/0170889 A1  Jul. 5, 2012

(30) Foreign Application Priority Data
Dec. 4, 2009  (JP) ................... 2009-276532

(51) Int. Cl.
*G02B 6/26* (2006.01)
*G02B 6/10* (2006.01)

(52) U.S. Cl.
USPC .............. 385/28; 385/39; 385/50; 385/130; 385/132

(58) Field of Classification Search
USPC .............. 385/27–28, 39, 50, 129, 130, 132
See application file for complete search history.

(56) References Cited

U.S. PATENT DOCUMENTS

| | | | |
|---|---|---|---|
| 5,432,872 A | 7/1995 | Stewart et al. | |
| 6,195,481 B1 | 2/2001 | Nakajima et al. | |
| 6,327,087 B1 | 12/2001 | Hashimoto et al. | |
| 6,553,164 B1 | 4/2003 | Ono et al. | |
| 6,900,925 B2 | 5/2005 | Kato et al. | |
| 7,038,834 B2 | 5/2006 | Kato et al. | |
| 7,220,009 B2 | 5/2007 | Shimada et al. | |
| 7,310,176 B2 | 12/2007 | Kato et al. | |
| 7,355,774 B2 | 4/2008 | Kato et al. | |
| 7,423,795 B2 | 9/2008 | Kato et al. | |
| 7,446,920 B2 | 11/2008 | Kato et al. | |
| 7,518,774 B2 | 4/2009 | Kato et al. | |
| 7,643,197 B2 | 1/2010 | Kato et al. | |
| 7,656,570 B2 | 2/2010 | Torashima et al. | |
| 7,855,820 B2 | 12/2010 | Kato et al. | |
| 2010/0002277 A1 | 1/2010 | Ushijima et al. | |
| 2011/0116145 A1 | 5/2011 | Fujii et al. | |

FOREIGN PATENT DOCUMENTS

| | | |
|---|---|---|
| EP | 1045263 A1 | 10/2000 |
| JP | 6235843 A | 8/1994 |
| JP | 08-171020 A | 7/1996 |
| JP | 2850996 B2 | 1/1999 |
| WO | 0011508 A1 | 3/2000 |

*Primary Examiner* — Uyen Chau N Le
*Assistant Examiner* — Michael Mooney
(74) *Attorney, Agent, or Firm* — Fitzpatrick, Cella, Harper & Scinto

(57) ABSTRACT

Provided is a mode converter capable of efficiently coupling or emitting light having a single-peaked spot, and has high flexibility of the shape to be easily manufactured. The mode converter is formed of multiple single-mode waveguides optically coupling areas 1 and 2; when an axis parallel to a light propagation direction is z axis, an axis perpendicular to the z axis in a direction crossing the single-mode waveguides is x axis, an axis perpendicular to the x and z axes is y axis, and a plane passing through a center of the mode converter and includes the z axis is plane 1, the multiple single-mode waveguides are arranged reflection-symmetrically with respect to the plane 1; and the mode converter converts light entering from the area 1 into the even mode to cause the light of the even mode to propagate and couple optically with the area 2.

6 Claims, 11 Drawing Sheets

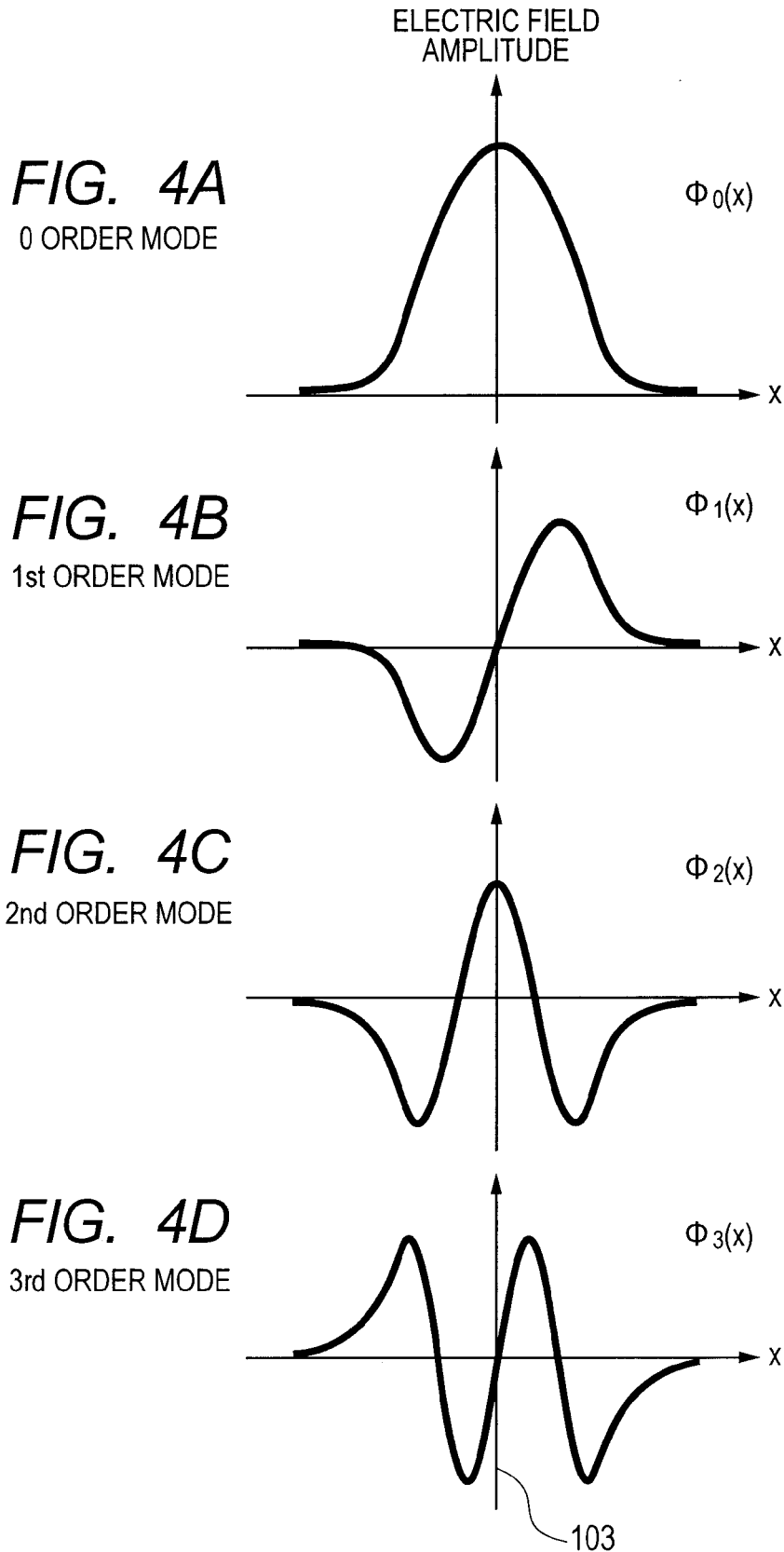
FIG. 4A 0 ORDER MODE
FIG. 4B 1st ORDER MODE
FIG. 4C 2nd ORDER MODE
FIG. 4D 3rd ORDER MODE

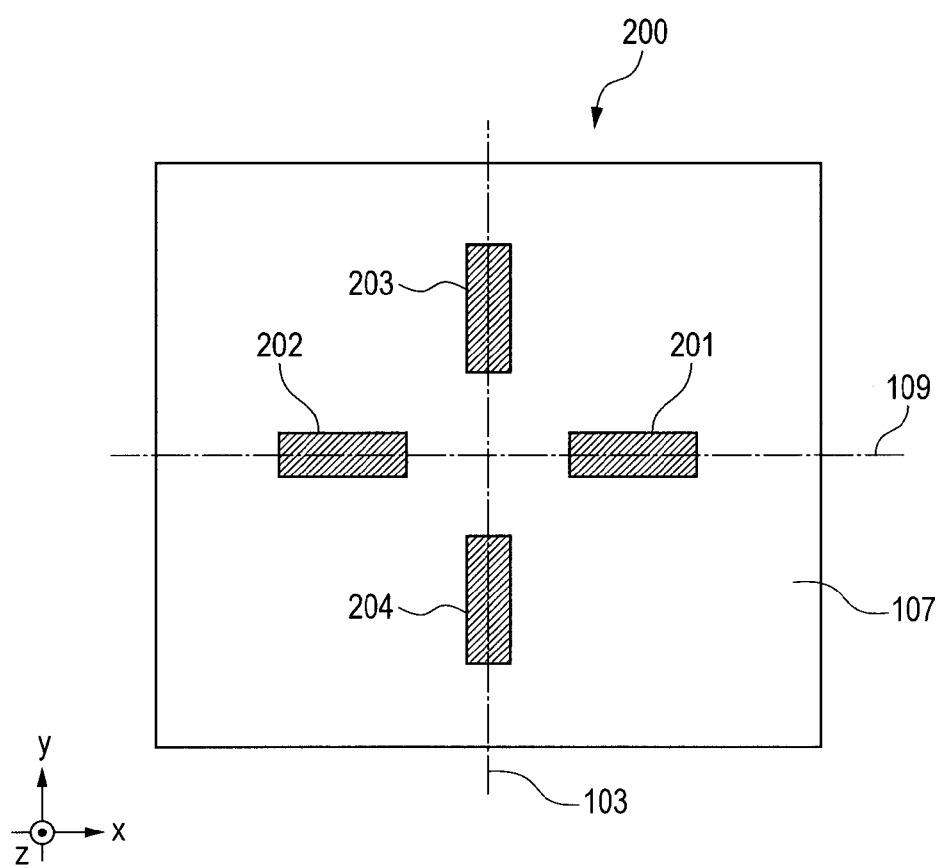

MODE CONVERTER

TECHNICAL FIELD

The present invention relates to a mode converter that is used for an optical device or the like.

BACKGROUND ART

When an optical device having a waveguide is used for controlling propagating light or for emitting light externally, a spot shape of light is required to be a single-peaked shape in view of convenience.

When two waveguides having different waveguide modes are optically coupled, it is necessary to couple the two waveguides under a state in which the single-peaked shape is maintained at high efficiency. However, when the two waveguides having different waveguide modes are directly butt-coupled, coupling efficiency is deteriorated so that the loss increases. In addition, in the coupled area, the waveguide mode is apt to be disturbed, and the light spot shape does not become the single-peaked shape.

As a conventional technology for dealing with those problems, there is known a method involving using a mode converter having a tapered structure or a stepped waveguide as disclosed in Japanese Patent No. 2850996 or Japanese Patent Application Laid-Open No. H08-171020.

FIGS. 12A and 12B illustrate mode converters having the tapered structure and the stepped waveguide according to those conventional examples. FIG. 12A illustrates a mode converter 400 having the tapered structure, and FIG. 12B illustrates a mode converter 401 having the stepped waveguide.

The mode converter having the tapered structure or the stepped waveguide illustrated in FIGS. 12A and 12B has a structure in which the width of a core part 106 (the length in the x direction in FIGS. 12A and 12B) is gradually changed so that the light spot size can be changed gradually while maintaining the single-peaked shape of the propagating light. Thus, the optical coupling is made, or the light is emitted externally.

SUMMARY OF INVENTION

Technical Problem

However, the mode converter 400 having the tapered structure and the mode converter 401 having the stepped waveguide according to those above-mentioned conventional examples illustrated in FIGS. 12A and 12B have a problem that a propagation characteristic thereof is sensitive to the shape, and hence manufacturing thereof requires many difficulties.

In the area where the widths of the mode converters 400 and 401 are the wavelength of the light or larger, multiple high order eigenmodes are apt to be generated. Therefore, a spot shape of the propagating light is apt to be disturbed in the area where the width of the core part 106 changes largely or in the area having a fluctuation in shape due to a manufacturing error.

In addition, the shape of the waveguide mode varies along with propagation.

Therefore, the mode converters 400 and 401 have the following problems. That is, in order to couple the light or to emit the light while maintaining the single-peaked shape, the lengths of the mode converters 400 and 401 in the z direction must be set in the discrete range, and hence the flexibility of the length is low. In addition, in particular, when a photonic crystal waveguide is used, it is difficult to make a structure in which the width of the optical waveguide varies continuously like the tapered structure, and therefore the spot shape is apt to be disturbed.

An object of the present invention is, in view of the above-mentioned problems, to provide a mode converter which is capable of coupling or emitting light having a single-peaked spot efficiently, and has high flexibility of the shape so as to be manufactured easily.

Solution to Problem

A mode converter according to the present invention is formed of multiple single-mode waveguides, for optically coupling two areas including an area 1 and an area 2, in which:

when an axis that is parallel to a light propagation direction is regarded as a z axis, an axis that is perpendicular to the z axis in a direction crossing the multiple single-mode waveguides is regarded as an x axis, an axis that is perpendicular to the x axis and the z axis is regarded as a y axis, and a plane that passes through a center of the mode converter and includes the z axis is regarded as a plane 1, the mode converter has a structure in which the multiple single-mode waveguides are arranged reflection-symmetrically with respect to the plane 1 so that light propagating in the mode converter has only one even mode with respect to the plane 1; and the mode converter converts light entering from the area 1 into the even mode to cause the light of the even mode to propagate and couple optically with the area 2.

Advantageous Effects of Invention

According to the present invention, it is possible to realize a mode converter which is capable of coupling or emitting light having a single-peaked spot efficiently, and has high flexibility of the shape so as to be manufactured easily.

BRIEF DESCRIPTION OF DRAWINGS

FIG. 4A is a graph illustrating a waveguide mode of a multi-mode waveguide of the first embodiment.

FIG. 4B is a graph illustrating a waveguide mode of a multi-mode waveguide of the first embodiment.

FIG. 4C is a graph illustrating a waveguide mode of a multi-mode waveguide of the first embodiment.

FIG. 4D is a graph illustrating a waveguide mode of a multi-mode waveguide of the first embodiment.

FIG. 10 is a diagram illustrating an xy plane of the mode converter of the second embodiment.

DESCRIPTION OF EMBODIMENTS

Figure 1:
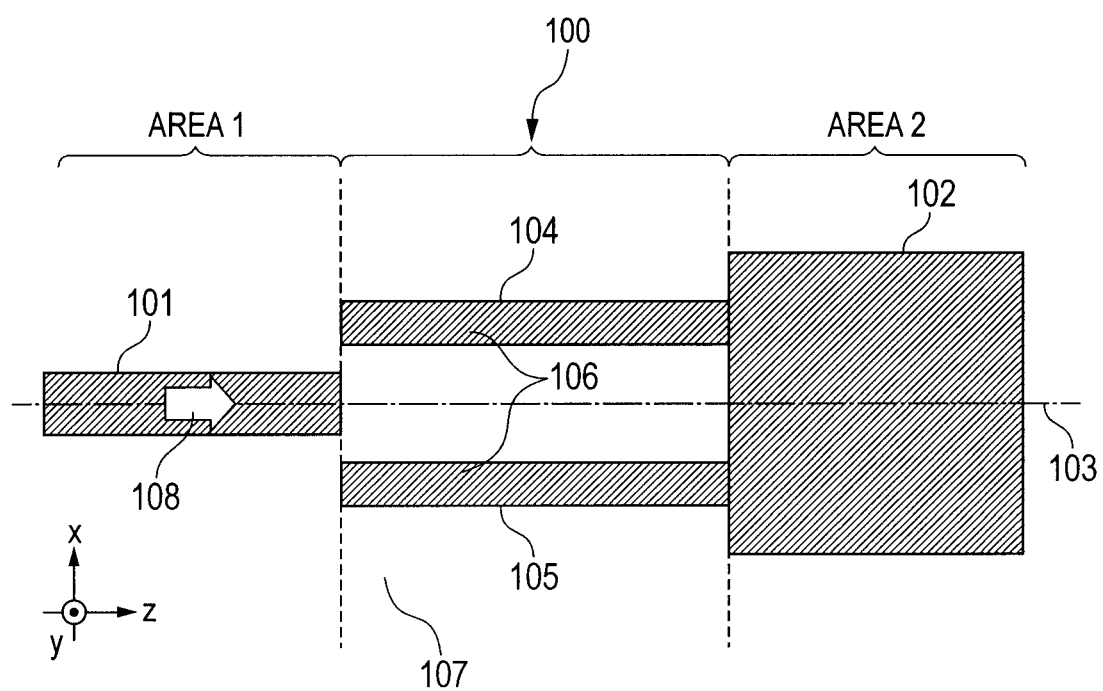
FIG. 1 is a diagram illustrating an xz plane of a mode converter according to a first embodiment for coupling an area 1 with an area 2.

The present invention is described with reference to the following embodiments.

Note that, elements having the same function are denoted by the same numerals in the drawings describing the following embodiments, and repeated description thereof is omitted.

EMBODIMENTS

First Embodiment

In a first embodiment, a structural example of a mode converter to which the present invention is applied is described. As illustrated in FIG. 1, a mode converter 100 of this embodiment includes two or more single-mode waveguides 104 and 105, which optically couple an area 1 and an area 2 having different waveguide modes.

In this embodiment, a single-mode waveguide 101 is formed in the area 1, and a multi-mode waveguide 102 is formed in the area 2. Here, incident light 108 propagates in the direction from the single-mode waveguide 101 to the multi-mode waveguide 102, and the propagation direction is regarded as a z axis direction. Further, the single-mode waveguide 101 and the multi-mode waveguide 102 are disposed so that the center axes thereof are identical to each other.

Figure 2A:
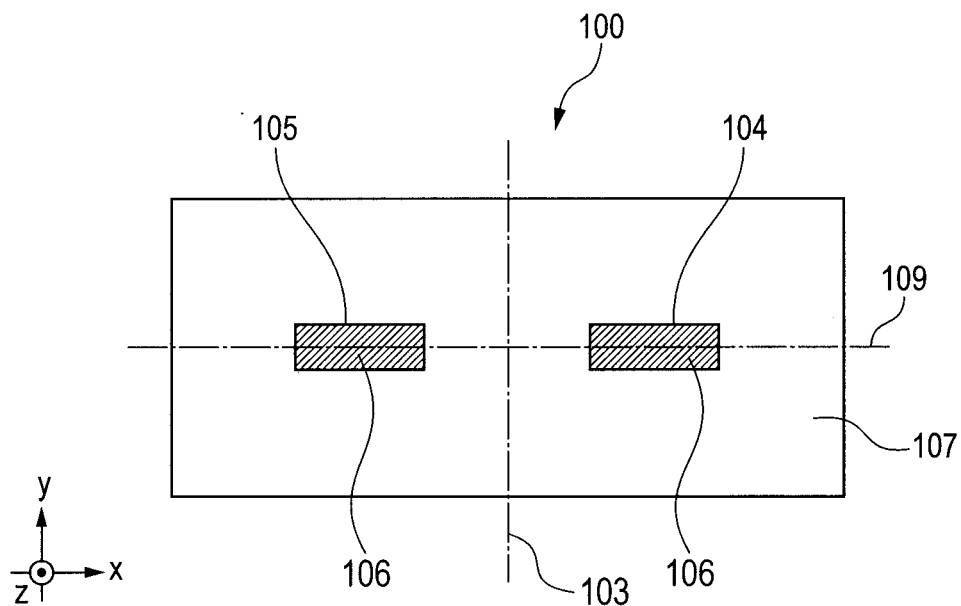
FIG. 2A is a schematic cross section of an xy plane of the mode converter according to the first embodiment.

In addition, the axis perpendicular to the z axis in the direction crossing the two single-mode waveguides is an x axis, and the axis perpendicular to the x axis and the z axis is a y axis. In addition, the plane that passes through the center of the mode converter 100 and is parallel to a yz plane is a plane 103 (plane 1), and the plane that passes through the center of the mode converter 100 and is parallel to an xz plane is a plane 109. FIG. 1 illustrates the xz cross sections of the single-mode waveguide 101, the multi-mode waveguide 102, and the mode converter 100, and FIG. 2A illustrates the xy cross section of the mode converter 100.

In addition, a length of each part in the direction parallel to the x axis is expressed as "width", and a length thereof in the direction parallel to the y axis is expressed as "height".

The mode converter 100 is formed by disposing the two identical single-mode waveguides 104 and 105 reflection-symmetrically with respect to the plane 103. In addition, the single-mode waveguides 104 and 105 are disposed so that the center axes thereof are included in the plane 109.

The single-mode waveguide 104 and the single-mode waveguide 105 are formed of core parts 106 and a clad portion 107 around the core parts 106. When the refractive index of the core part 106 is denoted by n1 while the refractive index of the clad portion 107 is denoted by n2, n1>n2 is satisfied.

The single-mode waveguide 104 and the single-mode waveguide 105 are formed of the same material, have the same width of the core part 106, and have the same height of the core part 106.

In addition, the core parts of the single-mode waveguide 101 and the multi-mode waveguide 102 have the same refractive index n1, and the clad portions thereof also have the same refractive index n2.

Figure 2B:
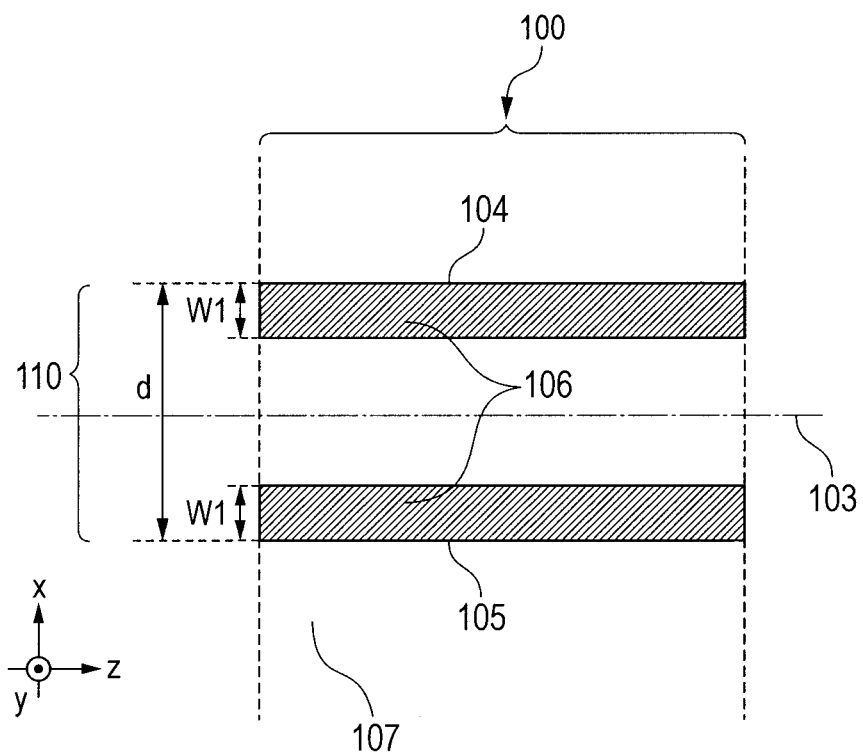
FIG. 2B is a schematic cross section of an xz plane of the mode converter.

As illustrated in FIG. 2B, the width of each of the core parts 106 of the single-mode waveguide 104 and the single-mode waveguide 105 is denoted by W1, and the width of a effective core part 110 of the mode converter 100 is denoted by d. Here, the effective core part 110 of the mode converter 100 means the area between the other side surface of a side surface of the single-mode waveguide 104 facing the plane 103 and the other side surface of a side surface of a single-mode waveguide 105 facing the plane 103 as illustrated in FIG. 2B.

Here, the waveguide mode propagating in the single-mode waveguide 101 and the multi-mode waveguide 102 illustrated in FIG. 1 is described. The waveguide mode propagating in the waveguide is determined uniquely by the refractive index of the core part, the refractive index of the clad portion, the width of the core part, and the wavelength of the light.

Figure 3:
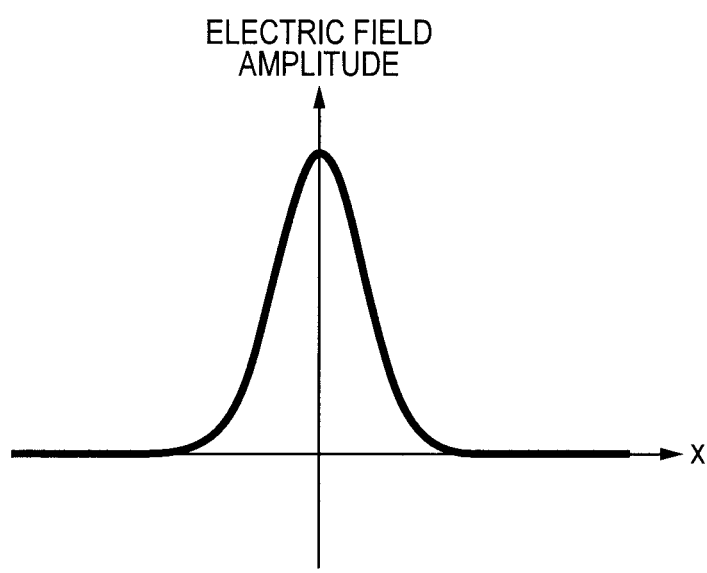
FIG. 3 is a graph illustrating a waveguide mode of a single-mode waveguide of the first embodiment.

The eigenmode in the xz plane of the single-mode waveguide 101 described above is illustrated in FIG. 3 in which the vertical axis represents electric field amplitude while the horizontal axis represents the x axis as coordinates. In addition, the eigenmodes of the multi-mode waveguide 102 is illustrated in FIGS. 4A, 4B, 4C, and 4D for each individual mode, in which the vertical axis represents electric field amplitude while the horizontal axis represents the x axis as coordinates. Here, a zero order mode and a second order mode that make even functions with respect to the plane 103 are called even modes, and a first order mode and a third order mode that make odd functions with respect to the plane 103 are called odd modes.

The waveguide mode propagating in the multi-mode waveguide 102 is expressed as a sum of the four eigenmodes including the zero order mode to the third order mode illustrated in FIGS. 4A, 4B, 4C, and 4D. The waveguide mode propagating in the single-mode waveguide 101 has only the zero order mode, and hence the single-peaked light of the even mode with respect to the plane 103 propagates. In order to permit the single-peaked light to propagate in the multi-mode waveguide 102, it is necessary to excite the zero order mode more than other high order modes.

Next, the waveguide mode propagating in the mode converter 100 is described.

Figure 5A:
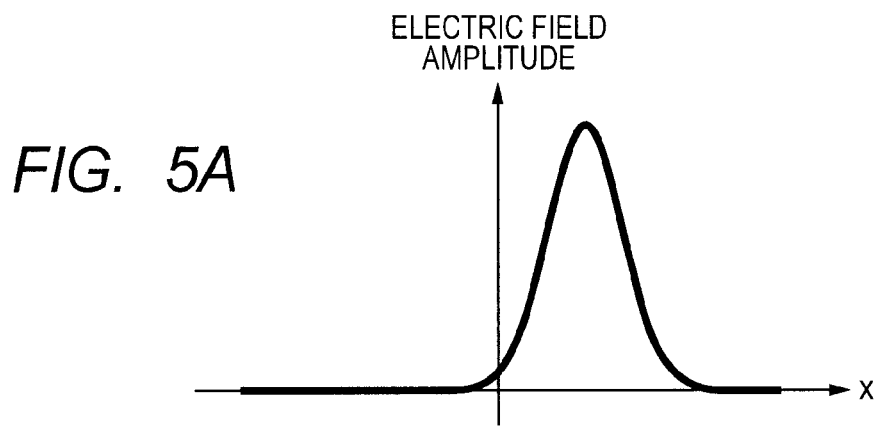
FIG. 5A is a graph illustrating a single unit waveguide mode in the single-mode waveguide of the first embodiment.
Figure 5B:
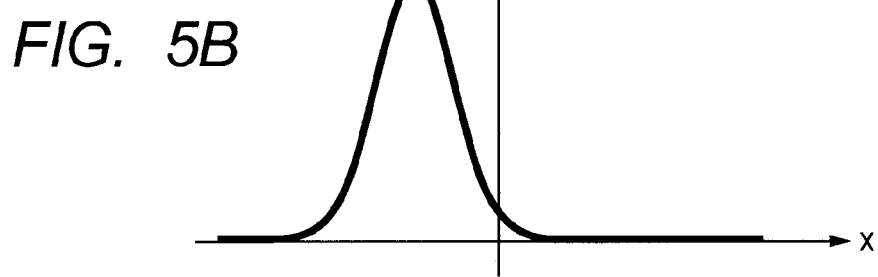
FIG. 5B is a graph illustrating a single unit waveguide mode in the single-mode waveguide of the first embodiment.

FIGS. 5A and 5B illustrate electric field amplitude distributions in the case where each of the single-mode waveguide 104 and the single-mode waveguide 105 is a single unit, in which the vertical axis represents the electric field amplitude while the horizontal axis represents the x axis as coordinates.

Figure 6A:
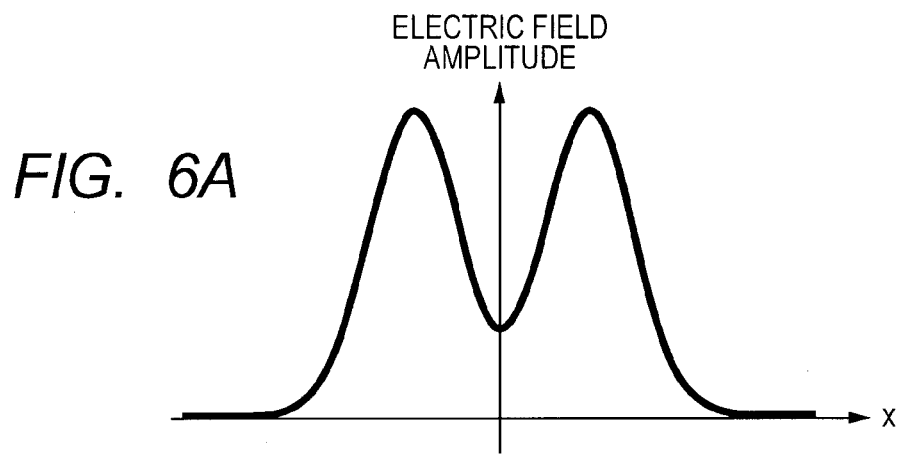
FIG. 6A is a graph illustrating a waveguide mode of the mode converter of the first embodiment.
Figure 6B:
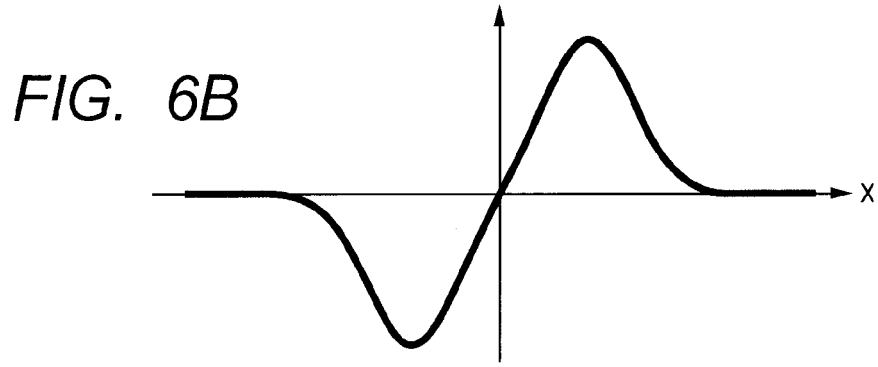
FIG. 6B is a graph illustrating a waveguide mode of the mode converter of the first embodiment.

In addition, FIGS. 6A and 6B illustrate electric field amplitude distributions of the waveguide mode of the mode converter 100 constituted of the single-mode waveguide 104 and the single-mode waveguide 105, in which the vertical axis represents the electric field amplitude while the horizontal axis represents the x axis as coordinates.

As illustrated in FIGS. 6A and 6B, the waveguide mode propagating in the mode converter 100 is expressed as a combination of the waveguide mode of the single-mode waveguide 104 as a single unit and the waveguide mode of the single-mode waveguide 105 as a single unit.

In this case, the mode converter 100 has two eigenmodes including one even mode (FIG. 6A) and one odd mode (FIG. 6B) with respect to the plane 103. In the case of the mode converter 100 described above, there are two eigenmodes and only one even mode. In this way, by adopting the reflection-symmetrical structure with respect to the plane 103 as in the case of the mode converter 100, the even mode light can propagate.

In addition, two single-mode waveguides are used for the structure, and hence the extension in the x direction of the waveguide mode becomes larger in the mode converter 100 compared with in the case of the single-mode waveguide 104 as a single unit or the single-mode waveguide 105 as a single unit.

The condition that the mode converter 100 has only one even mode can be set by using the normalized frequency V of the mode converter 100.

The normalized frequency V is a parameter that is used in a general waveguide. When the normalized frequency V is smaller than $(m+1) \cdot p/2$ (m is an integer), the number of the eigenmodes becomes m or smaller. When the optical waveguide has a reflection-symmetrical structure with respect to the center axis, the zero order (m=0), the first order (m=1), and the second order mode (m=2) become the even mode, the odd mode, and the even mode, respectively. Therefore, when m=1 and V<p hold, there is only one even mode.

In the structure of this embodiment, the normalized frequency V is expressed as follows.

The total width of the core part 106 of the single-mode waveguide 104 and the core part 106 of the single-mode waveguide 105 is denoted by W (=2×W1). In addition, the ratio of the circumference of a circle to its diameter is denoted by p, and the propagation constant of the incident light 108 in a vacuum is denoted by k0. In this case, when the refractive index of the core part 106 is denoted by n1, the refractive index of the clad portion is denoted by n2, the total width of the core parts 106 is denoted by W, the width of the effective core part 110 is denoted by d, and the propagation constant of the incident light 108 in a vacuum is denoted by k0, the normalized frequency V is expressed by the following equation (1) as a conditional equation.

$$V = \frac{k_0}{2}\sqrt{W \cdot d \cdot (n_1^2 - n_2^2)} \quad (1)$$

The parameter of the mode converter 100 is determined so that V in the equation (1) satisfies V<p.

With reference to the mode converter 100, a concept of coupling the single-peaked light from the single-mode waveguide 101 to the multi-mode waveguide 102 is described.

The incident light 108 propagating in the single-mode waveguide 101 becomes even mode light with respect to the plane 103 as described above. In this case, the light propagating in the mode converter 100 becomes even mode light with respect to the plane 103 (FIG. 6A). Here, the mode converter 100 has only one even mode, and hence light having a fixed shape of the waveguide mode propagates in the mode converter 100. Therefore, light having the same mode shape can be coupled to the multi-mode waveguide 102 regardless of the length in the z direction of the mode converter 100.

As illustrated in FIG. 6A, a sign of the electric field amplitude distribution of the waveguide mode propagating in the mode converter 100 is all positive or negative as a distribution state (hereinafter, referred to as "distribution in the same sign").

In addition, compared with the case of the single unit waveguide, light having extension of the electric field in the lateral direction (x direction) enters the multi-mode waveguide. When the light having the above-mentioned waveguide mode enters the multi-mode waveguide 102 from the mode converter 100, many zero order modes of the multi-mode waveguide 102 can be excited.

Here, the coupling efficiency of each eigenmode of the multi-mode waveguide 102 with respect to the light propagating in the mode converter 100 is described.

The normalized electric field amplitude distribution of each eigenmode of the multi-mode waveguide 102 and the propagation constant thereof are each expressed as follows.

$$\phi_j(x) \, \beta_j (j=0,1,2,3)$$

An order number of the mode is denoted by j.

The waveguide mode E(x,z) propagating in the multi-mode waveguide 102 is expressed as a sum of the individual eigenmodes, as shown in the following equation (2).

$$E(x, z) = \sum_{j=0}^{3} c_j \phi_j(x) e^{-i\beta_j z} \quad (2)$$

A coefficient of each mode is denoted by $c_j$.

In order to make a spot of light propagating in the multi-mode waveguide 102 a single-peaked shape, it is necessary to set the coefficient of the zero order mode to a large value.

Here, the boundary surface between the mode converter 100 and the multi-mode waveguide 102 is defined as z=z0. In addition, the electric field amplitude distribution in the xz cross section in z=z0 of the mode converter 100 is expressed as follows.

$$\phi(x)$$

Then, the coefficient of the eigenmode of the light propagating in the multi-mode waveguide 102 can be obtained by the following equation (3).

$$c_j = \frac{\int_{-\infty}^{\infty} \varphi(x)\phi_j(x)dx}{\int_{-\infty}^{\infty} |\phi_j(x)|^2 dx} \quad (3)$$

As the overlap integral between the electric field amplitude distribution of the mode converter 100 in z=z0 expressed as $$\phi(x)$$

and the electric field amplitude distribution of the multi-mode waveguide 102 in each eigenmode expressed as $$\phi_j(x)$$

is larger, the excited ratio becomes larger.

When the electric field amplitude distribution of the mode converter 100 in z=z0 expressed as $$\phi(x)$$

is the even mode, the overlap integral of the equation (3) becomes zero, and hence the odd mode light in the multi-mode waveguide 102 expressed as $$\phi_j(x) \ (j=1,3)$$

is not excited.

Here, when the mode converter 100 does not have a structure that is reflection-symmetrical with respect to the plane 103, the waveguide mode propagating in the mode converter 100 is also not reflection-symmetrical with respect to the plane 103. Therefore, the odd mode is excited in the multi-mode waveguide 102. Accordingly, it is necessary that the mode converter 100 be reflection-symmetrical with respect to the plane 103, for preventing the odd mode from being excited.

As described above, by using the mode converter 100, light having a single-peaked spot can be coupled efficiently from the single-mode waveguide 101 to the multi-mode waveguide 102. In addition, by adopting the structure of the two single-mode waveguides 104 and 105, design and manufacture can be facilitated.

Here, without limiting to two single-mode waveguides, three or more single-mode waveguides may be disposed so as to be reflection-symmetrical with respect to the plane 103 for forming the mode converter 100.

Figure 7A:
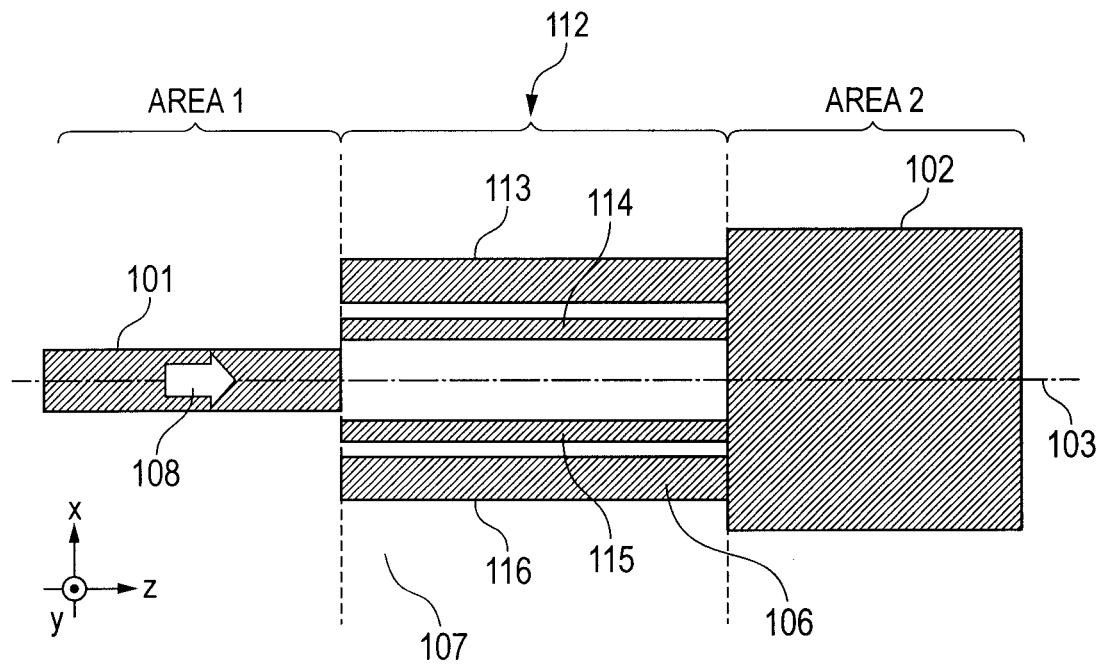
FIG. 7A is a diagram illustrating the xz plane of the mode converter of the first embodiment constituted of four single-mode waveguides.

FIG. 7A illustrates a mode converter 112 including four single-mode waveguides 113, 114, 115, and 116 as an example. The single-mode waveguide 113 and the single-mode waveguide 116 have the same material, width, and height as those of the core parts 106, and have the reflection-symmetrical relationship with respect to the plane 103. In addition, the single-mode waveguide 114 and the single-mode waveguide 115 have the same material, width, and height as those of the core parts 106, and have the reflection-symmetrical relationship with respect to the plane 103.

In this case, by using the normalized frequency V indicated by the above-mentioned equation (1) so that V<p is satisfied, the even mode of the mode converter 112 is set to be only one.

$$V = \frac{k_0}{2}\sqrt{W \cdot d \cdot (n_1^2 - n_2^2)} \quad (1)$$

where the total width of the core parts 106 of the four single-mode waveguides 113, 114, 115, and 116 is denoted by W.

Figure 7B:
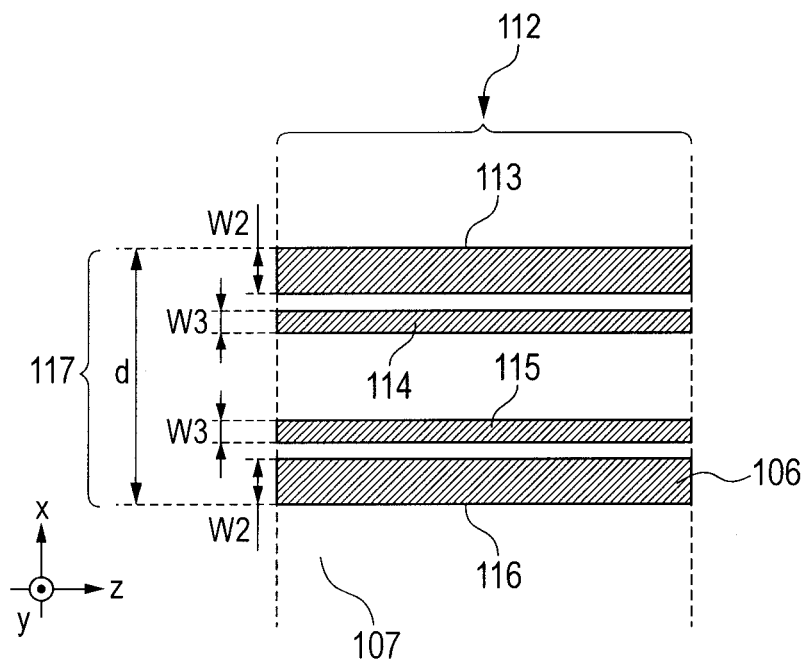
FIG. 7B is a diagram illustrating a mode converter of a comparison example.

As illustrated in FIG. 7B, the width of each of the core parts 106 of the single-mode waveguide 113 and the single-mode waveguide 116 is denoted by W2, and the width of each of the core parts 106 of the single-mode waveguide 114 and the single-mode waveguide 115 is denoted by W3. Then, W=2×W2+2×W3 holds.

The width of a effective core part 117 of the mode converter 112 is denoted by d. Here, the effective core part of the mode converter 112 means the area between the other side surface of a side surface of the single-mode waveguide 113 facing the plane 103 and the other side surface of a side surface of the single-mode waveguide 116 facing the plane 103, i.e. d denotes a distance between the end faces of the core parts of the single-mode waveguides in the position most distant from the plane 103, as illustrated in FIG. 7B.

By the same principle as the mode converter 100, the mode converter 112 can be used, so that design and manufacture can be facilitated, and light having a single-peaked spot can be coupled efficiently from the single-mode waveguide 101 to the multi-mode waveguide 102. In addition, by disposing multiple single-mode waveguides, the overlap integral with the zero order mode can be increased, and the coupling efficiency with the zero order mode can be improved.

Here, even in the case where the area 2 is not the multi-mode waveguide 102 but is a free space, the single-peaked light can be emitted to the free space by the same principle. When the electric field amplitude distribution at an emission outlet is distributed in the same sign and is distributed in the even mode, a far field pattern of the emitted light becomes a single-peaked shape.

In addition, a resonator may be used instead of the single-mode waveguide 101. In this case, an electric field distribution generated around the resonator is set to be reflection-symmetrical with respect to the plane 103.

By disposing the mode converter 100 at an position overlapping with the electric field distribution generated around the resonator, the even mode light can be guided to the mode converter 100. In addition, the single-mode waveguide 101, the multi-mode waveguide 102, or the mode converter 100 may be made of photonic crystal. When the single-mode waveguide 101, the multi-mode waveguide 102, or the mode converter 100 is made of photonic crystal, a light propagation loss can be reduced.

In addition, materials of the core part and the clad portion are not limited to those described above in this embodiment, but the core part and the clad portion may be made of other materials.

In addition, in the mode converter 100 illustrated in FIGS. 1 and 2A, by arrangement of the single-mode waveguides 104 and 105, generation of second or higher order even mode in the multi-mode waveguide 102 can be suppressed.

Figure 8A:
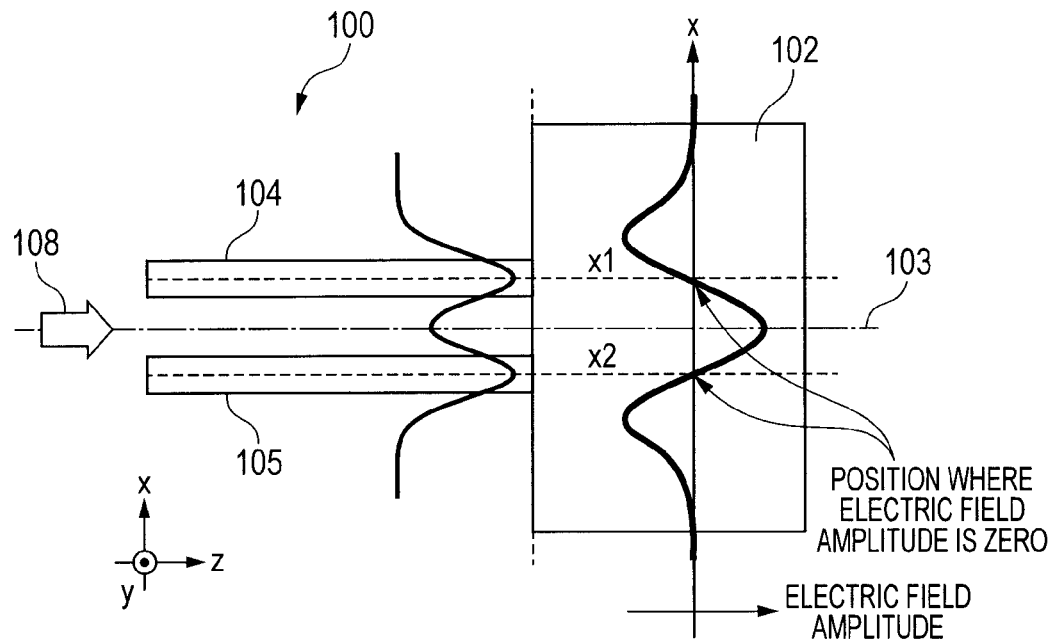
FIG. 8A is a diagram illustrating an xz plane of the mode converter of the first embodiment.

As illustrated in FIG. 8A, the mode converter 100 is constituted so that the centers of edge portions of the single-mode waveguide 104 and the single-mode waveguide 105 are respectively arranged at the positions where the electric field amplitude of the second order mode in the x direction of the multi-mode waveguide 102 is zero. Thus, generation of high order even mode can be suppressed.

Here, coordinates at which the electric field amplitude of the second order mode in the multi-mode waveguide 102 is zero in the x direction are denoted by x1 and x2. Further, the center coordinates of edge portions of the single-mode waveguide 104 and the single-mode waveguide 105 are arranged to be x1 and x2, respectively. With this structure, the ratio of exciting the second order mode in the multi-mode waveguide 102 can be suppressed.

This is because a positive area and a negative area of the electric field amplitude of the second order mode are distributed on the left and the right with respect to the coordinates x1 and x2. When the single-mode light enters the coordinates x1 and x2 from the single-mode waveguides 104 and 105, respectively, the overlap integral with the second order mode is decreased so that the ratio of exciting the second order mode can be suppressed.

In addition, even in the case where a higher order even mode such as a fourth order mode exists in the multi-mode waveguide 102, there is a position where the electric field amplitude becomes zero in the vicinity of the coordinates x1 and x2. Therefore, the high order even mode can be suppressed by the same reason.

Here, a ratio of exciting each eigenmode in the multi-mode waveguide 102 is described below.

The core part 106 may be made of InGaAs, for example, and the clad portion 107 may be made of InP, for example.

When the wavelength of the incident light 108 in a vacuum is λ=1.55 μm, the refractive indices of the core part 106 and the clad portion 107 are n1=3.3 and n2=3.17, respectively. Here, it is provided that the width of the core part of the incident side single-mode waveguide 101 is 0.5 μm, and that the width of the core part of the exit side multi-mode waveguide 102 is 5 μm. The width of each of the core parts 106 of the single-mode waveguides 104 and 105 constituting the mode converter 100 is W1=0.9 μm, and that the width of the effective core part 110 of the mode converter 100 is d=2.5 μm. The wavelength of the incident light 108 is λ=1.55 μm. In this case, the normalized frequency of the mode converter 100 becomes V=0.92 p, and hence only one even mode exists.

In this case, when the light that has propagated in the mode converter 100 is coupled to the multi-mode waveguide 102, the zero order mode is excited by 96% of the whole, and the second order mode is excited by 4% of the whole, as a result.

Figure 8B:
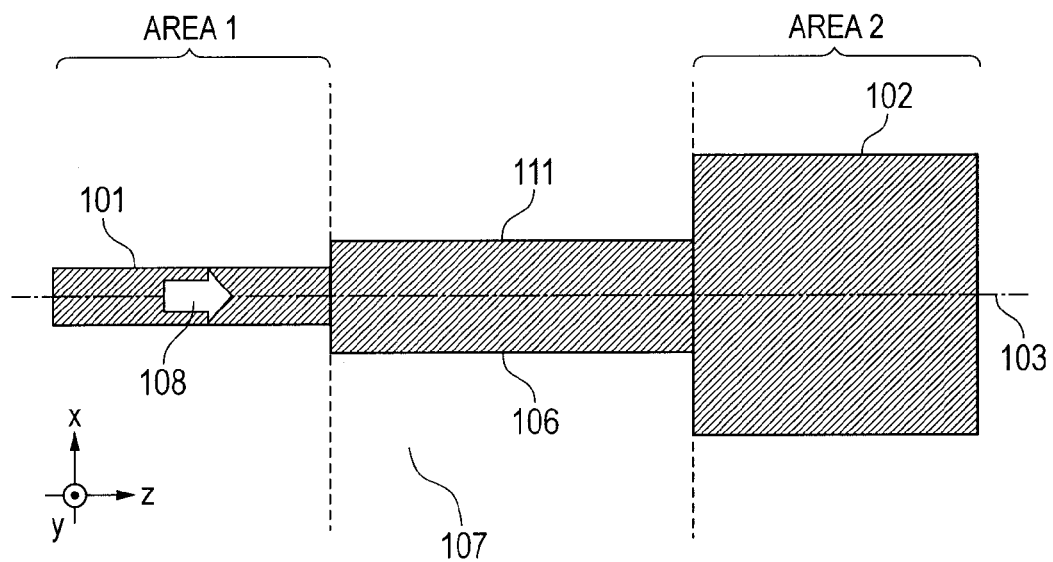
FIG. 8B is a diagram illustrating an xz plane of a waveguide that couples the area 1 with the area 2.

For comparison, the case where the mode converter is constituted of one waveguide 111 having a uniform core part 106 as illustrated in FIG. 8B is described.

The waveguide 111 is disposed to be reflection-symmetrical with respect to the plane 103. The refractive index of the core part is set to 3.3, and the refractive index of the clad portion is set to 3.17. The width of the waveguide 111 is set to be the largest waveguide width having only one even mode. In this case, the width of the core part 106 is W1=1.6 μm. In this case, when the incident light 108 enters from the single-mode waveguide 101, even mode light having a fixed mode shape propagates because the waveguide 111 has only one even mode.

In the multi-mode waveguide 102, the zero order mode was excited by 55% of the whole, and the second order mode was excited by 45% of the whole, as a result.

Therefore, more zero order mode is excited in the mode converter 100 than in the waveguide 111 so as to be coupled as the single-peaked light. This is because the mode converter 100 exhibits higher suppression property of generation of the high order mode more. In addition, it is due to a higher coupling efficiency with the zero order mode because the electric field distribution is extended more in the x direction in the waveguide mode propagating in the mode converter 100.

Here, it is possible to increase the extension of the waveguide mode in the lateral direction in the waveguide 111 by further increasing the width of the core part 106.

However, when the width of the core part 106 of the waveguide 111 is further increased, two or more even modes are generated. In this case, the waveguide mode changes its shape while propagating in the waveguide 111. Unless the length of the waveguide 111 in the z direction is set precisely, the ratio of exciting the zero order mode is decreased in z=z0. As a result, the single-peaked light does not propagate in the multi-mode waveguide 102.

It is also possible to increase the extension of the waveguide mode in the lateral direction by extremely reducing the width of the core part 106 of the waveguide 111. In this case, however, the shape of the waveguide mode largely changes, and hence the overlap integral with the zero order mode is decreased, and the coupling efficiency is low.

The same is true in the tapered structure and the stepped waveguide. In the area where the width of the core part increases such as the tapered structure or the stepped waveguide, a high order mode is generated, and hence it is difficult to make the tapered structure or the stepped waveguide because of being sensitive to the shape. In addition, even in the case where the width is decreased extremely, the coupling efficiency is lowered.

Second Embodiment

Figure 9A:
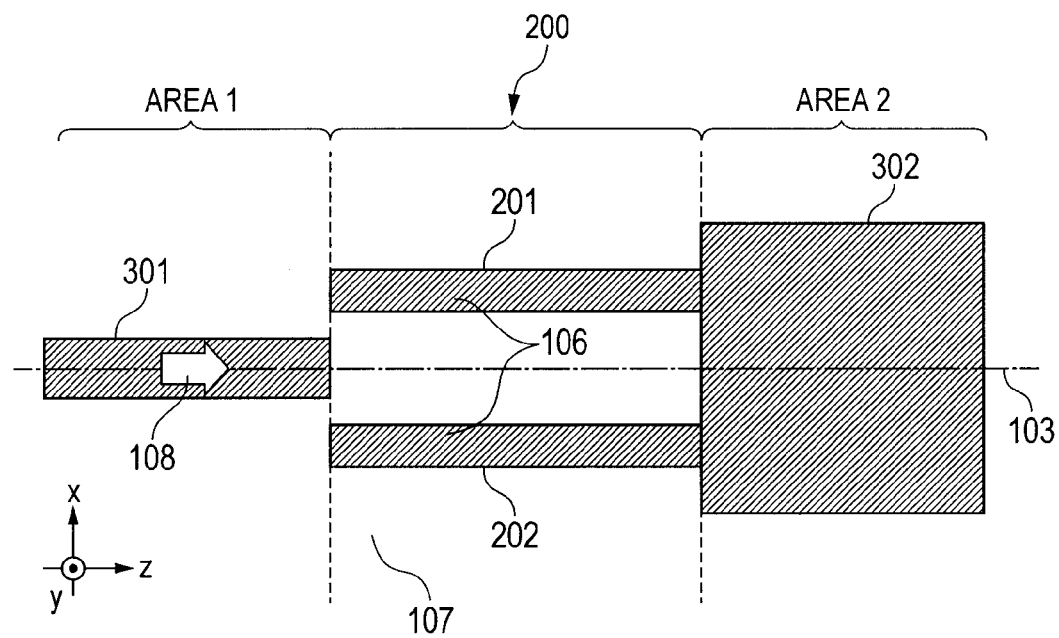
FIG. 9A respectively is a diagram illustrating an xz plane and a yz plane of a mode converter in a second embodiment that couples the area 1 with the area 2.
Figure 9B:
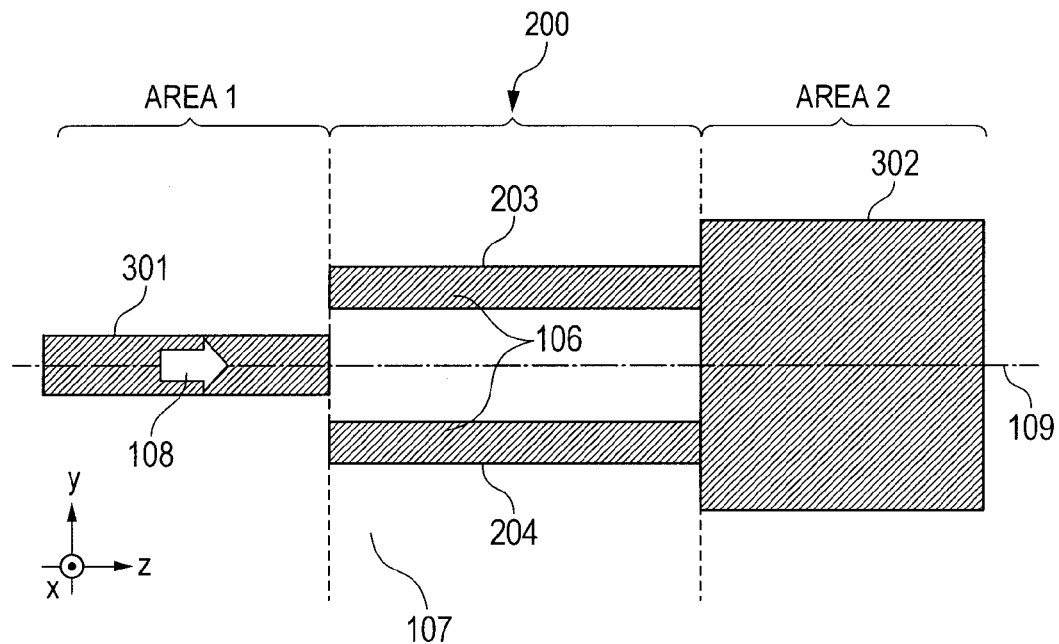
FIG. 9B respectively is a diagram illustrating an xz plane and a yz plane of a mode converter in a second embodiment that couples the area 1 with the area 2.

In a second embodiment, with reference to FIGS. 9A, 9B, and FIG. 10, a structural example of a mode converter 200 having a structure different from that of the first embodiment is described.

In the mode converter 200 of this embodiment, a single-mode waveguide 301 is formed in the area 1, and a multi-mode waveguide 302 is formed in the area 2. It is provided that the incident light 108 propagates in the direction from the single-mode waveguide 301 to the multi-mode waveguide 302, and the propagation direction is regarded as the z axis direction. The single-mode waveguide 301 and the multi-mode waveguide 302 are disposed so that the center axes thereof are identical to each other.

FIG. 9A illustrates xz cross sections of the single-mode waveguide 301, the multi-mode waveguide 302, and the mode converter 200, and FIG. 9B illustrates yz cross sections of the same. FIG. 10 illustrates an xy cross section of the mode converter 200. The single-mode waveguide 301 and the multi-mode waveguide 302 have the same structures as the single-mode waveguide 101 and the multi-mode waveguide 102 of the first embodiment, respectively, and the configuration of the mode converter 200 is different therefrom.

Similarly to the first embodiment, the plane passing through the center of the mode converter 200 and is parallel to the yz plane is the plane 103, and the plane passing through the center of the mode converter 200 and is parallel to the xz plane is the plane 109.

The mode converter 200 includes four single-mode waveguides 201, 202, 203, and 204, which are arranged in a three-dimensional manner to have a reflection-symmetrical structure with respect to the two planes, that is, to the plane 103 and the plane 109. In addition, as illustrated in FIG. 10, the single-mode waveguides 201 and 202 are arranged so that the center axes thereof are included in the plane 109, and the single-mode waveguides 203 and 204 are arranged so that the center axes thereof are included in the plane 103.

Here, the core parts 106 and the clad portions 107 of the single-mode waveguides 201, 202, 203, and 204 are respectively made of the same material as those of the core parts and the clad portions of the single-mode waveguide 301 and the multi-mode waveguide 302. When the refractive index of the core part 106 is denoted by n1, and the refractive index of the clad portion 107 is denoted by n2, n1>n2 is satisfied.

The widths of the core parts 106 of the single-mode waveguide 201 and the single-mode waveguide 202 are set to be equal to each other, and the heights thereof are also set to be equal to each other. The single-mode waveguide 201 and the single-mode waveguide 202 have a reflection-symmetrical relationship with respect to the plane 103. The widths of the core parts 106 of the single-mode waveguide 203 and the single-mode waveguide 204 are set to be equal to each other, and the heights thereof are also set to be equal to each other. The single-mode waveguide 203 and the single-mode waveguide 204 have a reflection-symmetrical relationship with respect to the plane 109.

With this configuration that the mode converter 200 is made to have a reflection-symmetrical structure with respect to multiple planes, the waveguide mode propagating in the mode converter 200 can also have a reflection-symmetrical shape with respect to the multiple planes.

As a result, a single-peaked light with a regular shape that is symmetric with respect to multiple directions can be coupled.

Here, the height (length in the y direction) and the width (length in the x direction) in the cross section of the single-mode waveguide 301 are equal to each other. In addition, the height (length in the y direction) and the width (length in the x direction) in the cross section of the multi-mode waveguide 302 are equal to each other.

Here, the core part 106 is made of InGaAs, for example, and the clad portion 107 is made of InP, for example.

When the wavelength of the incident light 108 in a vacuum is λ=1.55 μm, the refractive indices of the core part 106 and the clad portion 107 are n1=3.3 and n2=3.17, respectively. The width and the height of the core part of the single-mode waveguide 301 on the incident side are 0.5 μm, and the width and the height of the core part of the multi-mode waveguide 302 on the exit side are 5 μm.

Figure 11A:
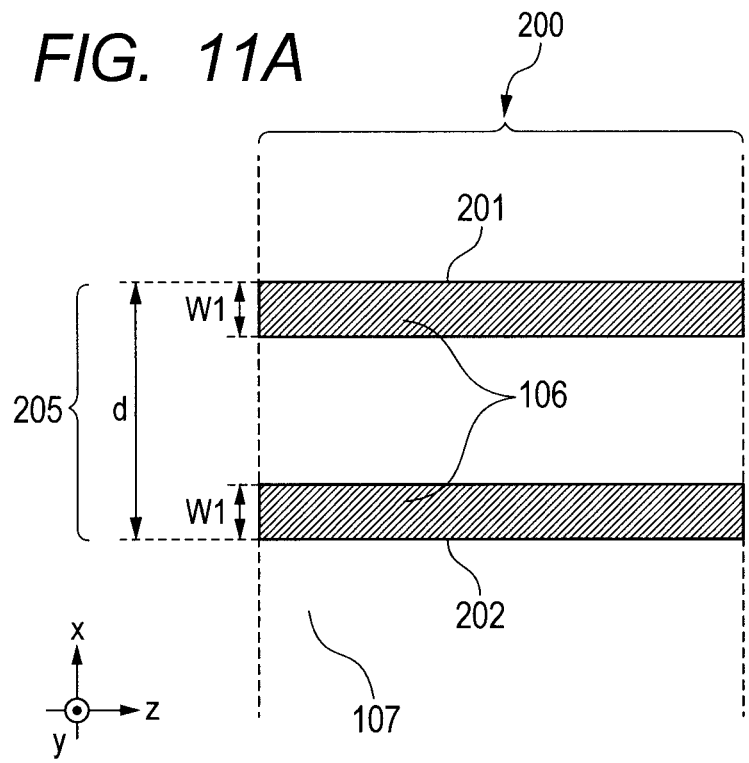
FIG. 11A respectively is a diagram illustrating an xz plane and an yz plane of the mode converter of the second embodiment.

In addition, each of the lengths of the core parts 106 in the x direction of the single-mode waveguides 201 and 201 in the xz cross section illustrated in FIG. 11A is W1=0.9 μm. In addition, the length of a effective core part 205 in the x direction of the mode converter 200 is d=2.5 μm.

Figure 11B:
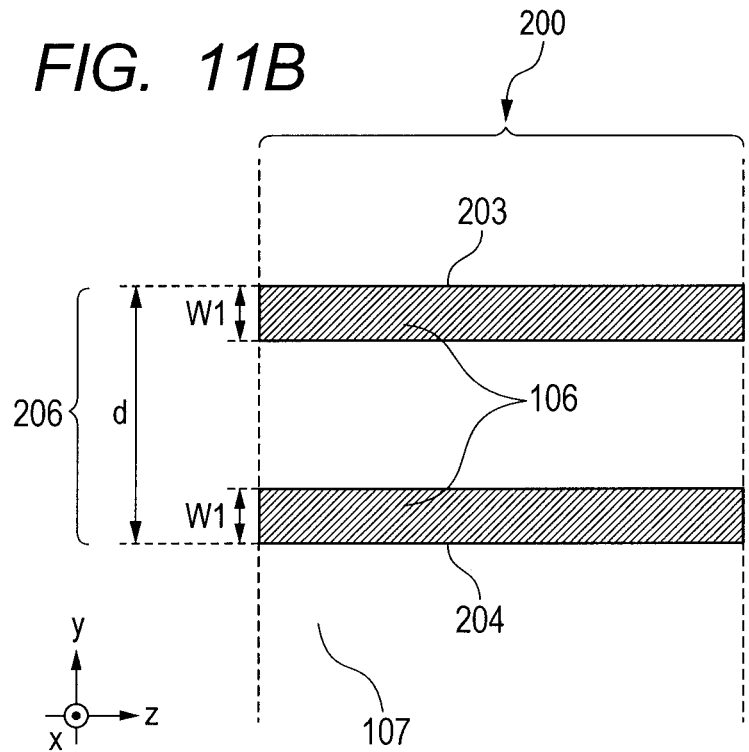
FIG. 11B respectively is a diagrams illustrating an xz plane and an yz plane of the mode converter of the second embodiment.
Figure 12A:
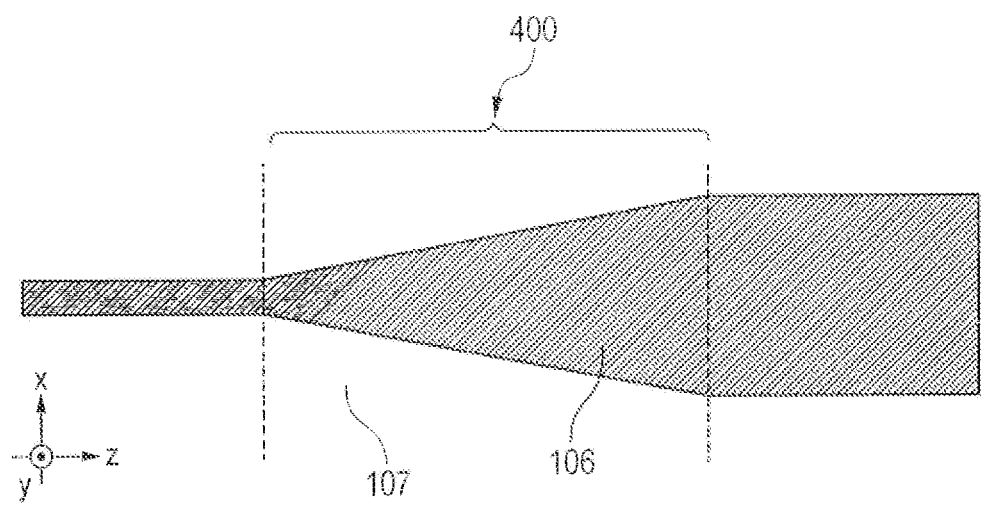
FIG. 12A is a diagram illustrating xz planes of mode converters of conventional examples.
Figure 12B:
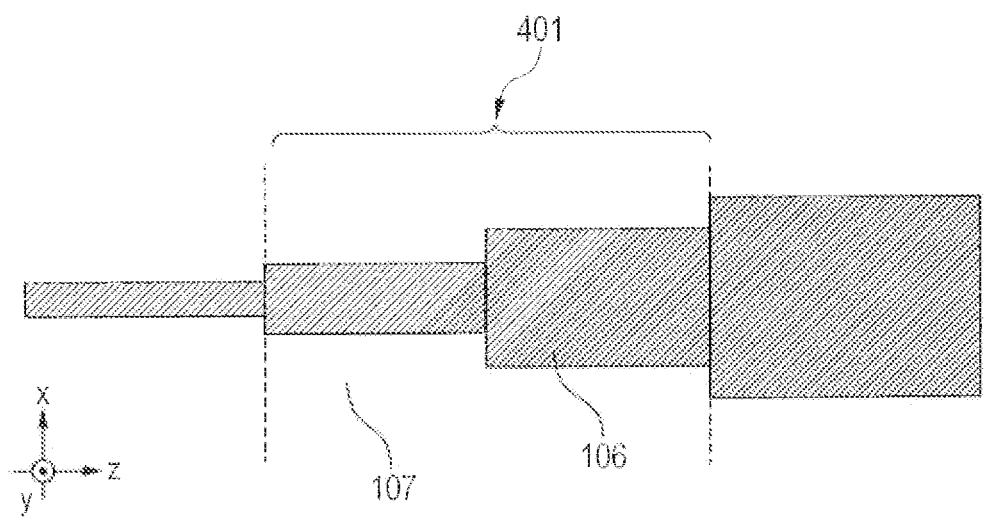
FIG. 12B is a diagram illustrating xz planes of mode converters of conventional examples.

Similarly, each of the lengths of the core parts 106 in the y direction of the single-mode waveguides 203 and 204 in the yz cross section illustrated in FIG. 11B is W1=0.9 μm. In addition, the length of a effective core part 206 in the y direction of the mode converter 200 is d=2.5 μm.

The wavelength in a vacuum of the incident light 108 entering from the single-mode waveguide 301 is λ=1.55 μm. In this case, the normalized frequency of the mode converter 200 expressed by the equation (1) is V<p in each plane of the xz cross section (plane 109) and the yz cross section (plane 103) of the mode converter 200.

Therefore, the mode converter 200 has only one even mode in each of the xz plane and the yz plane.

In this case, in the xz cross section illustrated in FIG. 11A and in the yz cross section illustrated in FIG. 11B, the dimensions are the same as illustrated in the first embodiment.

By using the above-mentioned mode converter 200, in two planes of the xz cross section and the yz cross section, according to the same principle as in the first embodiment, the single-peaked light can be coupled efficiently from the single-mode waveguide 301 to the multi-mode waveguide 302.

The single-peaked shape is obtained with respect to two planes of the xz cross section and the yz cross section, and hence light with a spot having regular shape that involves higher convenience can be obtained. Here, the width and the height in the xy cross section may not be the same length between the single-mode waveguide 301 and the multi-mode waveguide 302, and may be different lengths. In this case, the single-peaked light can be coupled efficiently by setting appropriate dimensions of the single-mode waveguides 201, 202, 203, and 204 constituting the mode converter 200, according to the principle described above in the first embodiment.

This application claims the benefit of Japanese Patent Application No. 2009-276532, filed on Dec. 4, 2009, which is hereby incorporated by reference herein in its entirety.

The invention claimed is:

1. A mode converter comprising multiple single-mode waveguides, for optically coupling two different areas including an area 1 and an area 2, wherein:

when an axis that is parallel to a light propagation direction is regarded as a z axis, an axis that is perpendicular to the z axis in a direction crossing the multiple single-mode waveguides is regarded as an x axis, an axis that is perpendicular to the x axis and the z axis is regarded as a y axis, and a plane that passes through a center of the mode converter and includes the z axis is regarded as a plane 1, the mode converter has a structure in which the multiple single-mode waveguides are arranged reflection-symmetrically with respect to the plane 1 so that light propagating in the mode converter has only one even mode with respect to the plane 1;

the mode converter converts light entering from the area 1 into the even mode to cause the light of the even mode to propagate and couple optically with the area 2; and the multiple single-mode waveguides are each formed of a core part having a refractive index n1 and a clad portion having a refractive index n2, and the following conditional equation is satisfied:

$$V = \frac{k_0}{2}\sqrt{W \cdot d \cdot (n_1^2 - n_2^2)} < p,$$

where V denotes a normalized frequency of the mode converter, d denotes a distance between the end faces of the core parts of the single-mode waveguides in the position most distant from the plane 1, W denotes a total width of the core parts of the multiple single-mode waveguides included in the mode converter when a length in a direction parallel to the x axis is regarded as a width, $k_0$ denotes a propagation constant of incident light in a vacuum, and p denotes a ratio of a circumference of a circle to a diameter of the circle.

2. A mode converter comprising multiple single-mode waveguides, for optically coupling two different areas including an area 1 and an area 2, wherein:

when an axis that is parallel to a light propagation direction is regarded as a z axis, an axis that is perpendicular to the z axis in a direction crossing the multiple single-mode waveguides is regarded as an x axis, an axis that is perpendicular to the x axis and the z axis is regarded as a y axis, and a plane that passes through a center of the mode converter and includes the z axis is regarded as a plane 1, the mode converter has a structure in which the multiple single-mode waveguides are arranged reflection-symmetrically with respect to the plane 1 so that light propagating in the mode converter has only one even mode with respect to the plane 1;

the mode converter converts light entering from the area 1 into the even mode to cause the light of the even mode to propagate and couple optically with the area 2; and the area 2 is a multi-mode waveguide, and when coordinates where an electric field amplitude of a second order mode becomes zero in an x direction in a waveguide mode of the multi-mode waveguide in an xz plane are denoted by x1 and x2, center coordinates of edge portions of two of the multiple single-mode optical waveguides included in the mode converter are arranged to be x1 and x2.

3. A mode converter according to claim 1, wherein the plane 1 includes multiple planes including the z axis, and the multiple single-mode waveguides are arranged reflection-symmetrically with respect to the multiple planes.

4. A mode converter according to claim 1, wherein at least one of the area 1, the area 2, and the mode converter comprises photonic crystal.

5. A mode converter according to claim 2, wherein the plane 1 includes multiple planes including the z axis, and the multiple single-mode waveguides are arranged reflection-symmetrically with respect to the multiple planes.

6. A mode converter according to claim 2, wherein at least one of the area 1, the area 2, and the mode converter comprises photonic crystal.

* * * * *